Feb. 14, 1928.
C. S. HALL
1,659,098
AIRCRAFT PROPELLING MECHANISM
Filed Feb. 11, 1925  2 Sheets-Sheet 2
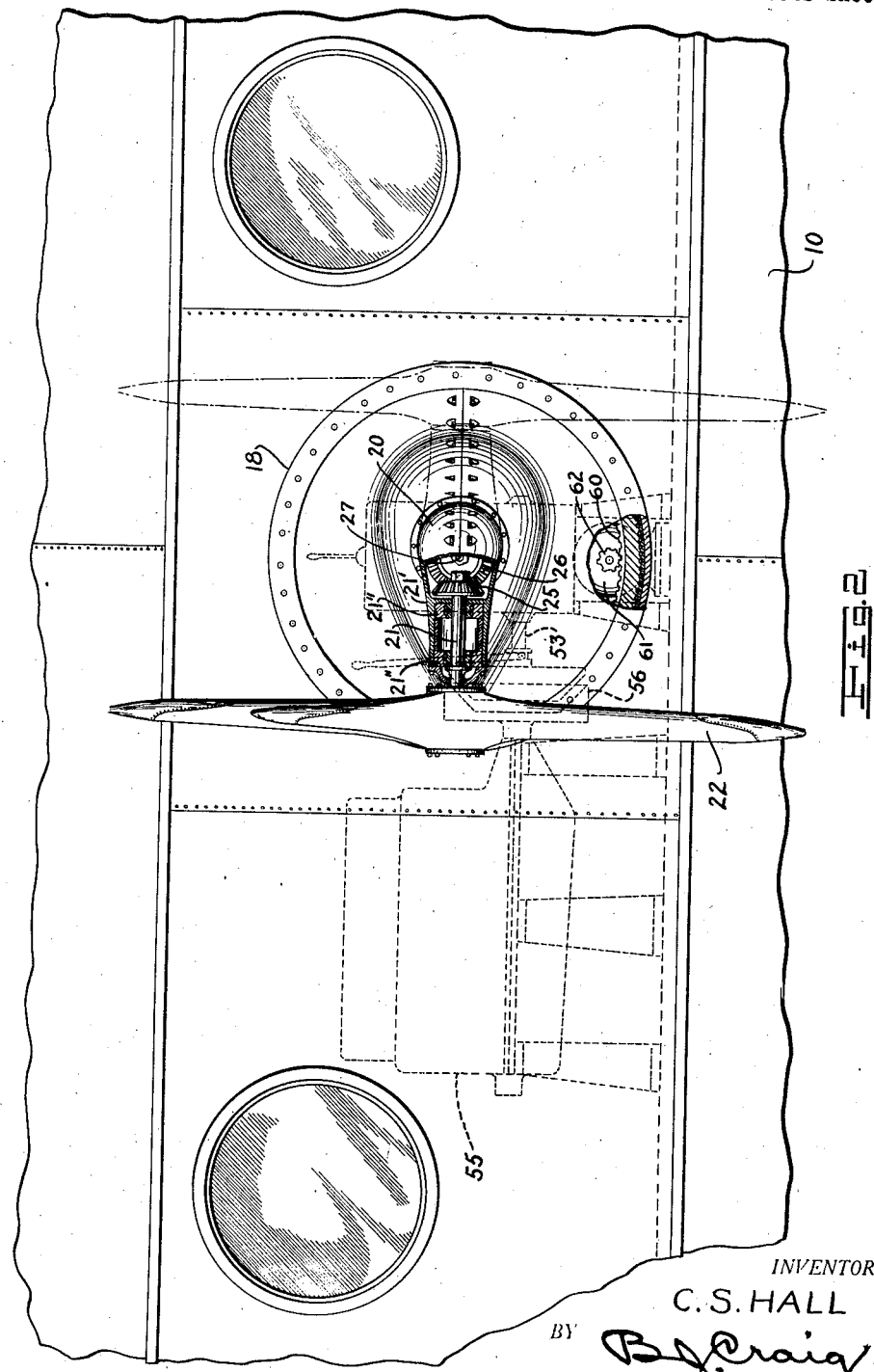
INVENTOR.
C. S. HALL
BY
ATTORNEY.

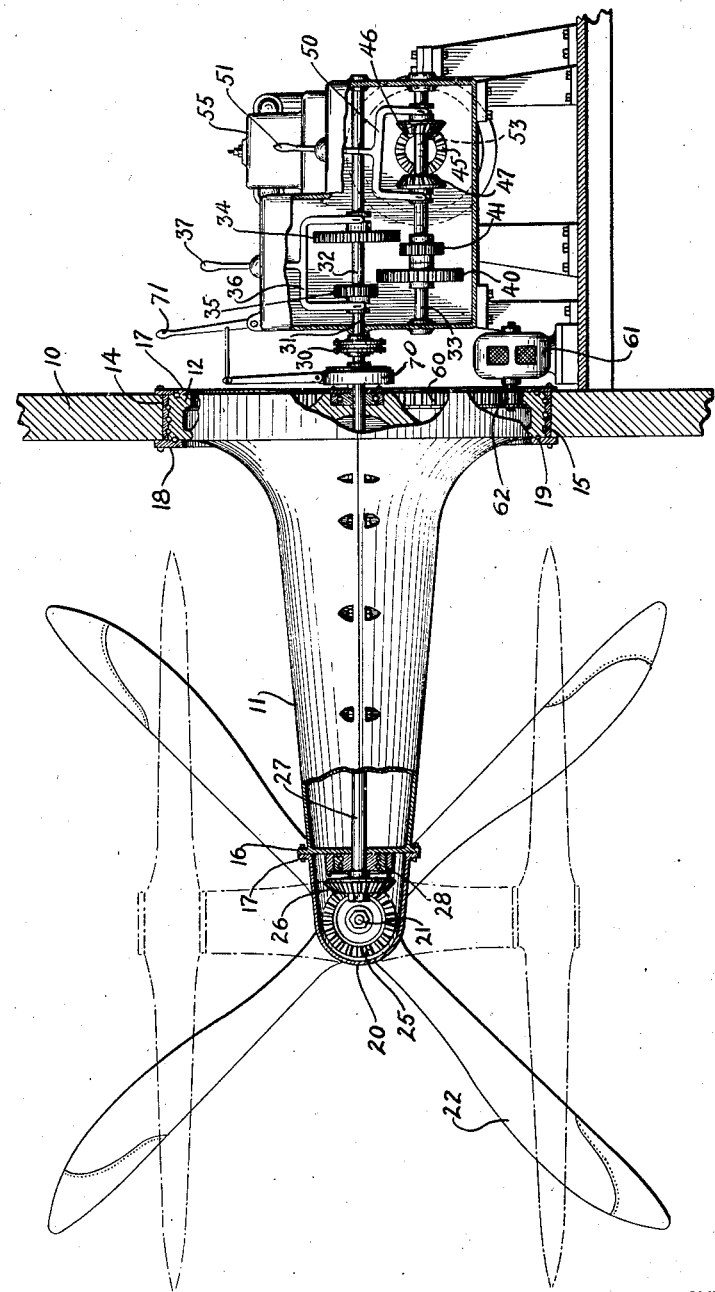

Patented Feb. 14, 1928.

1,659,098

UNITED STATES PATENT OFFICE.

CHARLES S. HALL, OF OAKLAND, CALIFORNIA, ASSIGNOR TO HALL AIRWAYS CORPORATION, OF DOVER, DELAWARE, A CORPORATION.

AIRCRAFT-PROPELLING MECHANISM.

Application filed February 11, 1925. Serial No. 8,383.

This invention relates to aircraft propelling mechanism.

The general object of the invention is to provide an improved mechanism for driving an aircraft whereby complete control of the aircraft as well as efficient operation thereof will be provided.

One of the specific objects of the invention is to provide an aircraft driving device wherein a screw propeller is mounted in a novel manner.

A further object of the invention is to provide a screw propeller for driving aircraft wherein a novel mechanism is arranged for driving the propeller in a forward or reverse direction and for changing the speed of the propeller.

A further object of the invention is to provide an aircraft propelling device wherein a propeller is mounted to move to positions to give a thrust in different directions and wherein there is combined with the mechanism means for changing the speed of the propeller without altering the speed of the prime mover driving the propeller.

Other objects of the invention will be apparent from the following description taken in connection with the accompanying drawings wherein Fig. 1 is an elevation partly in section showing my improved propeller and Fig. 2 is an elevation taken at right angles to the elevation shown in Fig. 1.

Referring to the drawing by reference characters, I have shown the body of an aircraft at 10. This aircraft may be a lighter than air aircraft such as a dirigible or it may be of a heavier than air type such as an airplane or a helicopter. In the embodiment shown, the propeller comprises a casing 11 which is rotatably mounted on the body 10 thereon. The casing 11 has a base flange 12 thereon. This flange fits within a collar 14 secured to the body 10 while suitable anti-friction means such as ball races 15 serve to provide smooth operation.

In order to prevent tilting of propeller casing 11, and at the same time to provide ease of operation, I provide retaining plates 17 and 18 on opposite sides of the base 12. Ball races 19 between the plates and the base furnish an anti-friction bearing for this portion of the device.

The casing 11 preferably tapers as shown and at its outer end is provided with a flange 16 for engagement with a flange 17 mounted on a propeller gear housing 20. The propeller is shown as provided with a shaft 21 and the propeller as indicated is of the type having four blades 22 although a greater or less number of blades may be provided if desired.

The shaft 21 by referring to Fig. 2 will be seen to be mounted in a portion 21' of the housing 20. The casing 21' has ball races 21" therein and these ball races serve as a mounting for the shaft 21. Mounted on the shaft 21 and rigid with respect to the propeller blades 22 I show a bevel gear 25. This bevel gear 25 meshes with a companion bevel gear 26 which is adapted to be driven by a shaft 27. The shaft 27 is mounted in bearings 28 as shown in Fig. 1.

The shaft 27 passes through the interior of the casing 11 and is connected by means of a universal joint 30 with a shaft 31 of a change speed mechanism. This change speed mechanism comprises a pair of aligned shafts 32 and 33. Keyed on the shaft 32 I show gears 34 and 35. These gears are both mounted to slide along the shaft 32 and are fixed so that the rotation of either gear will drive the shaft 27 and rotate the propellers 22. In order to move the gears 34 and 35 I provide a yoke 36 having an operating lever 37 whereby it may be shifted.

On the shaft 33 I provide a pair of gears 40 and 41. The gears 40 and 41 are keyed on the shaft 33 in fixed position. By referring to Fig. 1 it will be apparent that by rocking the arm 37 the gear 34 may be placed in mesh with the gear 41 to give one speed, while an opposite movement of the arm 37 will place the gear 35 in mesh with the gear 40 to give another speed.

In order to provide for reversal movement of the propeller, I show the shaft 33 as adapted to be driven from a bevel gear 45 by coacting bevel gears. These coacting gears shown at 46 and 47 are keyed on the shaft 33 to slide therealong and to rotate therewith. In order to control the gears 46 and 47 and at the same time to provide means for reversing the direction of the propellers, I show a yoke 50 which has an arm engaging each of the gears. This yoke is adapted to be operated by means of an arm 51 so that either the gear 46 or the gear 47 will be in mesh with the gear 45.

The gear 45 is mounted on a shaft 53 which may be driven by a prime mover shown as a gas engine 55. A clutch 56 connects the shaft 53 and the gas engine 55.

In order to rotate the casing 11 and thus change the direction of the thrust of the propellers, I show an internal gear 60 mounted in the base 12. This gear may be driven in any desired manner, but I now prefer to drive it by means of an electric motor 61 which has a spur gear 62 upon its armature shaft.

In order to slow down the propeller shaft 22 quickly when desired, I mount a brake 70 on this shaft 27. The brake 70 may be controlled by a lever 71 mounted adjacent to the arm 37.

The propeller gear housing 20 is made fluid tight and I preferably fill this housing with lubricating material. The lubricating material in this housing will pass through the ball races 21″ and thus lubricate these bearings which support the shaft 21.

From the foregoing description it will be apparent that I have provided a novel means for mounting, driving and controlling the speed and the direction of the thrust of a propelling means for aircraft and that my improved device can be economically manufactured and is extremely simple in operation.

Having thus described my invention, I claim:

1. In an aircraft, a body, a shaft, a propeller thereon, means to drive said propeller shaft, said means comprising a second shaft, a power shaft, change speed gears between said second shaft and said power shaft, a prime mover, means to connect said prime mover and said power shaft and means to reverse the direction of movement of said power shaft without reversing the direction of the prime mover.

2. In an aircraft, a body, a casing mounted to rotate thereon, said casing including a shaft, means to drive said shaft, a propeller, means to drive said propeller from said shaft, means to rotate said casing, and means to drive said propeller shaft, said means comprising a stub shaft, a power shaft, a gear connecting said stub shaft and said power shaft, a prime mover, means to connect said prime mover and said power shaft and means to reverse the direction of movement of said power shaft without reversing the direction of the prime mover.

3. In an aircraft, a sustaining body, a propeller, means to mount said propeller on said body, a drive shaft for said propeller, a second shaft, a universal joint connecting said two shafts, a third shaft, said third shaft having gears thereon, gears on said second shaft, means to move certain of said gears to engaged position, a pair of bevel gears on said third shaft, a fourth shaft, a bevel gear on said fourth shaft, and means to move either one of said pair of bevel gears into engagement with the gear on the fourth shaft to reverse the direction of rotation of the propeller shaft.

4. In an aircraft, a body, a support mounted to rotate thereon, said support having a shaft rotatable thereon, a prime mover connected to said shaft, to drive the same, a propeller, a shaft for said propeller, meshing gears on said shafts for driving said propeller, means to rotate said support and means to support said propeller shaft, said means comprising spaced bearings, said bearings both being spaced from said gears and arranged between said gears and said propeller.

5. In an aircraft, a body having a collar fitted thereon, a propeller mounting, a propeller thereon, said mounting including a flange supported in said collar, spaced anti-friction means between said flange and said collar to take up radial thrusts and retaining means to prevent both front and backward longitudinal movement between the collar and the flange, said last mentioned means including anti-friction members.

6. In an aircraft including a body portion, propellers adapted to drive said aircraft, means to shiftably mount said propellers on the sides of the body portion of said aircraft whereby said propellers may rotate transversely of said aircraft, a single one of said mounting means including a casing projecting outward from the side of said body portion and rotatable relative thereto, means to retain said casing in a fixed transverse and longitudinal position relative to said body portion, said means including thrust and radial anti-friction bearings, gear teeth on said casing adjacent said body of said aircraft and means engaging said gear teeth to move the same to cause said casing to revolve, a shaft mounted in said casing, another shaft mounted in said casing at right angles to said first mentioned shaft, said second mentioned shaft being connected to a propeller, a prime mover adapted to drive said first mentioned shaft through the medium of reversing and change speed gears and clutch means, and means to drive said second mentioned shaft from said first mentioned shaft whereby said propeller will be driven.

In testimony whereof, I hereunto affix my signature.

CHARLES S. HALL.